United States Patent Office.

HERMANN GUSSMANN, OF HÖCHST-ON-THE-MAIN, GERMANY, ASSIGNOR TO THE FARBWERKE, VORMALS MEISTER, LUCIUS & BRÜNING, OF SAME PLACE.

BLUE COTTON SULFUR DYE AND PROCESS OF MAKING SAME.

SPECIFICATION forming part of Letters Patent No. 657,768, dated September 11, 1900.

Application filed June 3, 1899. Serial No. 719,292. (Specimens.)

*To all whom it may concern:*

Be it known that I, HERMANN GUSSMANN, Ph. D., a citizen of the Empire of Germany, residing at Höchst-on-the-Main, Germany, have invented certain new and useful Improvements in the Manufacture of a Blue Cotton Dyestuff, of which the following is a specification.

If oxynitrodiphenylaminsulfonic acid of the formula

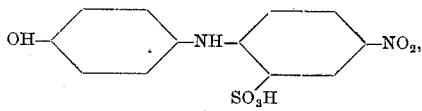

obtained by condensing nitrochlorbenzenesulfonic acid with p-amidophenol be reduced, oxyamidodiphenylaminsulfonic acid is obtained, having the formula

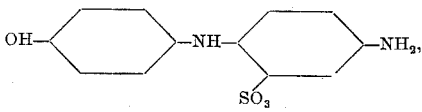

and if the latter be melted in the usual manner with caustic alkalies the sulfonic group is exchanged for OH and dioxyamidodiphenylamin is obtained, having the formula

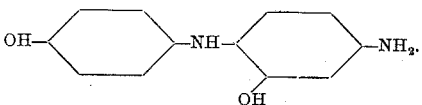

This dioxyamidodiphenylamin is precipitated from its alkaline solutions, which in contact with air become intensely violet by means of sulfuric acid as a sulfate in form of fine gray-white needles.

Example: One hundred parts, by weight, of sulfid of sodium are melted with forty parts, by weight, of sulfur, to which are added thirty parts, by weight, of dioxyamidodiphenylamin in the form of the above-described sulfate at about 130° centigrade, the whole being then heated while stirring to about 160° to 180° centigrade, till the foaming caused by the evolution of sulfid of hydrogen has ceased. The temperature is then raised to about 200° centigrade, till the melt begins to get thick and consistent. After cooling there remains a dark brittle mass easily soluble in water and dyeing cotton green. The tints, however, become when dry and exposed to the air a beautiful blue. The dyestuff exists therefore in the melt as "leuco compound" and the aqueous solution has to be oxidized to obtain the dyestuff, which is best done by allowing a current of air to pass through or also by other agents, such as persulfate. After oxidation it is filtered from the separated sulfur and the dyestuff is precipitated by adding common salt. The dyestuff thus obtained is the sodium compound of an acid dyestuff. It forms when dry a dark-brown powder of copper luster easily soluble in water with a blue color, from the solutions of which it is again precipitated by means of acids as an acid dyestuff which is not soluble by itself in water, but only on addition of soda or alkali. Concentrated sulfuric acid dissolves the dyestuff with a dirty blue-green color and on addition of water the color turns a pure blue, precipitation taking place at the same time.

Having now described my invention, what I claim is—

1. The herein-described process of producing a blue cotton dyestuff, which consists in heating dioxyamidodiphenylamin with sulfur and sulfids of alkali metals, to a temperature of from 160° to 200° centigrade, and treating the mass thus obtained in an aqueous solution with oxidizing agents, substantially as set forth.

2. As a new product, the herein-described blue cotton dyestuff derived from dioxyamidodiphenylamin, being when dry a dark-brown powder of coppery luster, easily soluble in water with a blue color, precipitated from its aqueous solutions by means of acids as an acid dyestuff which is not soluble by itself in water, but soluble on addition of soda or alkali; said dyestuff dissolving in concentrated sulfuric acid with a dirty blue-green color which on addition of water turns a pure blue, precipitation taking place simultaneously, and dyeing mordanted cotton blue, substantially as set forth.

In testimony that I claim the foregoing as my invention I have signed my name in presence of two subscribing witnesses.

HERMANN GUSSMANN.

Witnesses:
HEINRICH HAHN,
ALFRED BRISBOIS.